United States Patent
Meiman et al.

(10) Patent No.: US 8,634,723 B2
(45) Date of Patent: Jan. 21, 2014

(54) OPTICAL COMMUNICATIONS WITH POLARIZATION DEPENDENT LOSS COMPENSATION

(75) Inventors: Yehouda Meiman, Rishon-Letzion (IL); Raanan Ivry, Caesarea (IL)

(73) Assignee: Celight, Silver Spring, MD (US)

( * ) Notice: Subject to any disclaimer, the term of this patent is extended or adjusted under 35 U.S.C. 154(b) by 375 days.

(21) Appl. No.: 12/969,045

(22) Filed: Dec. 15, 2010

(65) Prior Publication Data

US 2011/0150498 A1 Jun. 23, 2011

Related U.S. Application Data

(60) Provisional application No. 61/287,349, filed on Dec. 17, 2009.

(51) Int. Cl.
*H04B 10/00* (2013.01)
(52) U.S. Cl.
USPC ............................. 398/152; 398/79; 359/483

(58) Field of Classification Search
USPC ...................... 398/152, 79; 359/483, 484, 499
See application file for complete search history.

(56) References Cited

U.S. PATENT DOCUMENTS

2006/0228116 A1* 10/2006 Bontu et al. ................. 398/152
2010/0196008 A1* 8/2010 Szafraniec et al. ............. 398/65

* cited by examiner

*Primary Examiner* — M. R. Sedighian
(74) *Attorney, Agent, or Firm* — Nadya Reingand

(57) ABSTRACT

The invention related to the system and method for optical communication using light of two polarization states. Polarization distortion loss (PDL) is compensated by implementation of polarization controllers at both the transmitter and receiver sides. The transmitter controller performs a mixing transformation of beam with two polarizations, while the receiver controller performs the same transformation in the opposite direction with exactly same sequence as in the transmitter part. A cross scrambling and a polarization rotation represented by matrix multiplication are examples of such mixing polarization transformations. The averaged PDL induced errors are corrected by the FEC code plus interleavers.

16 Claims, 3 Drawing Sheets

(a)

(b)

OPTICAL COMMUNICATIONS WITH POLARIZATION DEPENDENT LOSS COMPENSATION

CROSS-REFERENCE TO RELATED APPLICATIONS

This application claims benefit of the provisional application No. 61/287,349 filed Dec. 17, 2009.

FIELD OF INVENTION

This invention relates generally to optical communications systems and methods. In particular the present invention addresses a method and system for polarization dependent loss compensation in optical signals received via optical fiber communication link. The invention discloses communication with up to 100 Gb/s transmission rate that can be implemented for various information exchange structures including video broadcasting.

BACKGROUND OF THE INVENTION

Polarization distortion loss (PDL) in fiber communication is caused by random polarization rotation combined with non isotropic loss of fiber (different loss for different polarization).

This loss especially in dual polarization (DP) communication can result in different signal level between the polarization signal in the receiver or in different SNR level.

Long-haul optical communications link typically consists of a number of spans separated by signal recovery units. A model for each span is shown in FIG. 1. The impairments consist of CD (Chromatic Dispersion), PMD (Polarization Mode Dispersion) and PDL (Polarization Dependent Loss). In general, a margin is taken (few dBs depending on the length of the fiber) to compensate for PDL.

The PDL is mostly caused by the EDFA. It is expected that for each EDFA (in each span), one polarity is attenuated more than the other. The attenuation is described in the matrix $$\begin{bmatrix} k_i & 0 \\ 0 & 1 \end{bmatrix},$$

where $k_i$ may be in the order of 0.1-0.2 dB.

After attenuation, the signal is rotated and dispersed. The rotation is described in the matrix $$\begin{bmatrix} \cos(\alpha_i) & \sin(\alpha_i) \\ \sin(\alpha_i) & \cos(\alpha_i) \end{bmatrix},$$

see FIG. 1, where $\alpha_i$ is the rotation angle.

After each span the output in each polarity may be composed of both the input polarity depending on $\alpha_i$, which is a random variable.

So after N spans, the attenuation of one polarity compared to the other is a random variable. The attenuation caused by the PDL has influence on the SNR of each polarity. One polarity has a better SNR than the other polarity.

U.S. Pat. No. 6,760,149 describes a feedback system for PDL compensation. The system includes a monitor, a signal processor, a controller and a compensator. The monitor performs measurements of the transmission parameters. The signal processor calculates the PDL error function and the controller controls the PDL compensator.

There is a need for a system and method of PDL compensation which does not involve feedback and signal processing.

U.S. Pat. No. 6,437,892 discloses PDL compensation in an optical link transmitting light in one polarization state. The system cannot operate with dual-polarization transmission.

There is a need for a system and method of PDL compensation in an optical link with data transmission in dual polarization light, which allows doubling the transmission capacity.

In the preferred embodiment the optical system uses an Orthogonal frequency division multiplexing (OFDM) format. OFDM is widely used technique of transmission in the RF domain where it allows mitigating of signal fading in multi-path propagation. The present invention discloses the use of orthogonal frequency division multiplexing in optical links and, in particular, in fiber communications using dual-polarization transmission.

In optical OFDM each channel the optical carrier is directly modulated by a complex RF signal that can be construed as a linear combination of M separate digitally modulated RF signals at frequencies $f_m$ such that $f_m = m/T$ where T is the period of modulation. Thus the total symbol rate of the transmitted information is M/T. In the text we shall refer to the frequencies $f_m$ as "sub-carriers".

In modern communication systems, a coherent detection technique is implemented, which provides improved sensitivity compared with traditional direct detection schematics. Typically coherent detection is used for phase-shift-keying (PSK) data transmission. The present invention is also focused on PSK, and in the preferred embodiment, QPSK (quadrature PSK) data transmission. However this does not limit the scope of the invention, and various types of data modulation can benefit from the disclosed invention.

In coherent receiver, the QPSK incoming optical signal is mixed with a strong local oscillator signal to produce in-phase (I) and in-quadrature (Q) outputs. I and Q components of the output optical signal are converted into electrical signals by a set of photodetectors. In the preferred configuration four balanced photodetectors are used to recover QPSK encoded data.

Data transmission using light of two orthogonal polarizations via the same optical channel allows doubling the data rate. At the receiver side, the optical signal is split by a polarization beam splitter, and the light of each orthogonal polarization is mixed with a local oscillator signal of the corresponding polarization in the coherent receiver.

However the orthogonality of the optical signal polarization is not preserved when the signals are transmitted via fiber link. The received optical signals neither orthogonal to each other, nor aligned with the polarization beam splitter at the receiver side. The present invention addresses this problem of the polarization state recovery in dual-polarization data transmission.

SUMMARY OF THE INVENTION

The present invention provides a method and system for optical communications with a high traffic load. The system and method are disclosed for optical transmission with polarization dependent loss (PDL) compensation. Different aspects of the present invention may provide numerous technical advantages including significant improvements in a system performance accomplished by the modified transmitter and the receiver. The transmitter includes a data controller, which performs a mixing transformation on digital data for the beam with a first polarization state and data for the beam with a second polarization state. The first and the second polarization states are orthogonal each other, and in the preferred embodiment V and H linear polarizations are used. At the receiver side the data experiences the same mixing transformation, but in an opposite direction to a transmitter transformation with exactly same sequence as in the transmitter part.

In one embodiment the mixing transformation is cross scrambling, which can be random scrambling or periodical scrambling with certain known sequence.

In another embodiment the mixing transformation is a polarization rotation, where the rotation angle may change in time.

The transmitter is further equipped with a forward error correction (FEC) encoder unit, and a corresponding FEC decoder unit is placed at the receiver side. FEC block is longer than polarization correlation time.

In the preferred embodiment, the transmitter also includes an interleaver, and corresponding de-inverleaver is present at the receiver side; and wherein for the signal at rate R bit/sec, FEC block length of N bit and interleaving depth of M, the polarization correlation time T is T<=2*N*M/R.

Modulating an optical signal with data in each WDM channel by orthogonal frequency division multiplexing technique. The data is encoded using at least one of phase shift keying format, amplitude shift keying format, and frequency shift keying format.

In the preferred embodiment a coherent receiver based on 90-degrees optical hybrid is used to recover transmitted optical signal. The coherent optical receiver is adapted for operation with the optical signal of two polarization states.

It is another object of the present invention to provide a method for data transmission in dual polarization light via fiber link with PDL compensation.

DETAILED DESCRIPTION OF THE PREFERRED EMBODIMENT

This disclosure describes a number of embodiments of one or more optical transmission systems and elements. Within this disclosure, the term "optical" indicates electromagnetic range at or near optical frequencies; this includes visible light and so-called "near-visible" light such as near infrared, infrared, far infrared and the near and far ultra-violet spectra. The preferred operating range is around 1.5 micron.

Figure 1:
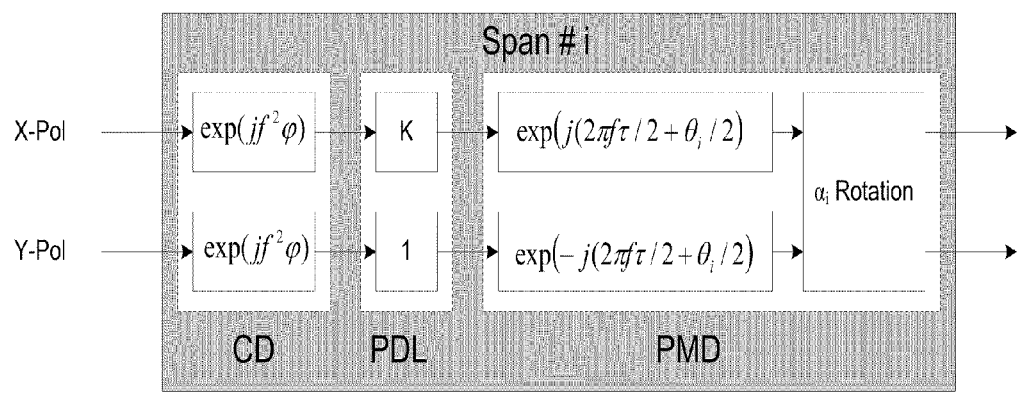
FIG. 1A block diagram of single span of the optical communications link.
Figure 2:
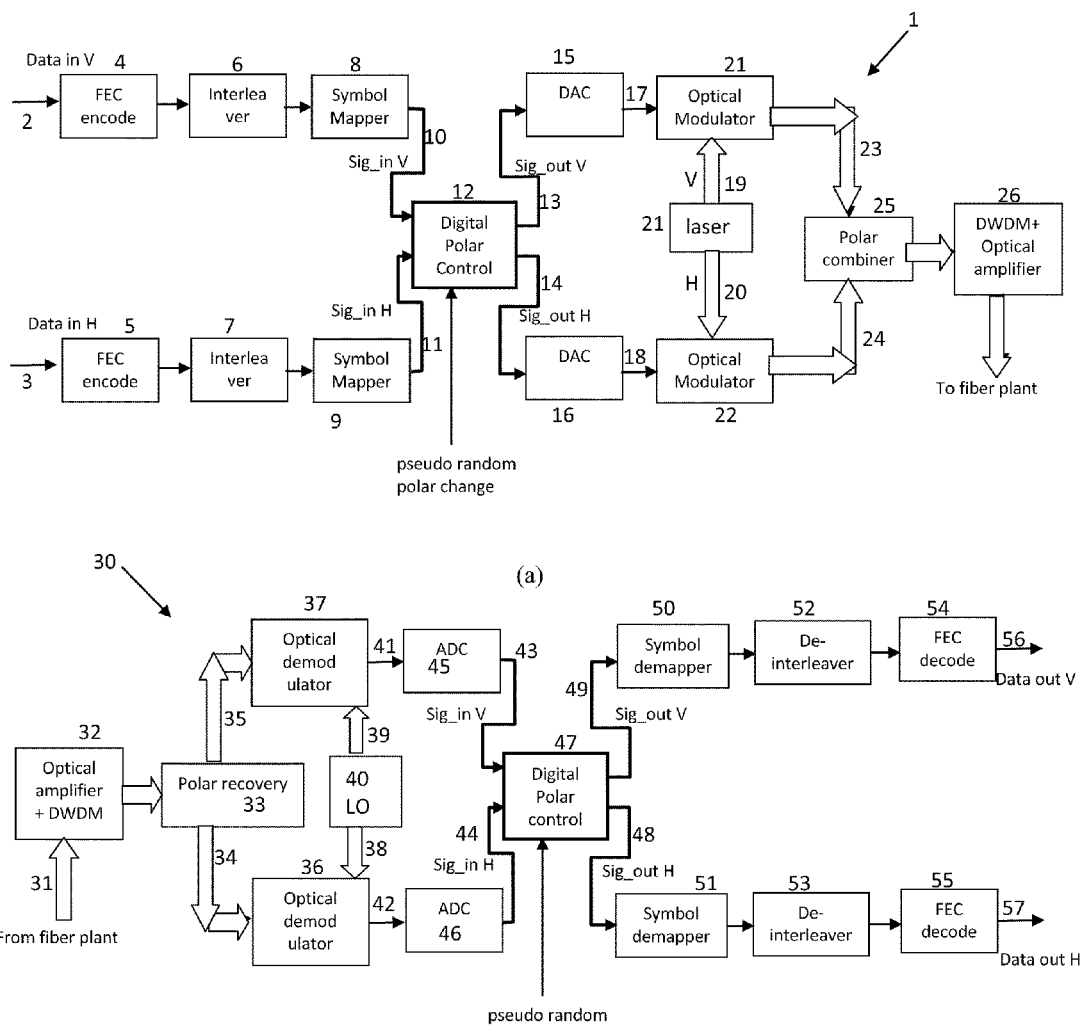
FIG. 2 shows (a) the transmitter and (b) the receiver layout in the preferred embodiment.

The transmitter and receiver block diagrams are shown in FIGS. 2 (a) and (b) for the preferred embodiment of the communication link.

At the Transmitter:

At the transmitter 1 the data 2 and 3 enter the system for each orthogonal polarization, named V (vertical) and H (horizontal), but can be any other orthogonal polarization pair such as RHC/LHC. The data is Forward Error Correction (FEC) encoded, Any suitable FEC code or algorithm known in the art may be used, for example Reed-Solomon code. As it is shown in FIG. 2, FEC encoder 4 and 5 encode electrical waveform before it is converted to an optical signal. Alternatively FECs may operate on directly on optical signals in V and H polarizations. FEC is used to correct the transmission impairments. FEC operation is based on transmission of parity information, and it works fine for recovering from individual errors occurred during the transmission. However, it does not recover information when burst-errors occur. The interleavers 6 and 7 serve to stretch the burst-errors by interleaving FEC codes resulted in their independent impairments. Next a group of data bit is mapped onto a symbol bit in Symbol Mappers 8 and 9. For example, four data bits are mapped onto a complex constellation of $2^4=16$ point, each point is represented by two digital signed value: real and imaginary.

The digital complex signals 10 and 11 named sig_in_V and sig_in_H respectively enter into a Digital Polarization Controller unit 12. In one embodiment, it performs a rotation transform function outputting two signals 13 and 14: sig_out_V and sig_out_H.

The transform function is implemented by digital multiplier and adder normally implemented in FPGA or in ASIC, the digital polarization rotation function is represented by the matrix multiplication:

$$\begin{bmatrix} SIG_{out}^V \\ SIG_{out}^H \end{bmatrix} = \begin{bmatrix} \cos(\alpha) & \sin(\alpha) \\ -\sin(\alpha) & \cos(\alpha) \end{bmatrix} \cdot \begin{bmatrix} SIG_{in}^V \\ SIG_{in}^H \end{bmatrix}$$

In another embodiment, the controller 12 performs bit cross scrambling. The data from V and H part are cross scrambled randomly, the function select randomly either D_out_V=D_in_V; and D_out_H=D_in_H; (straight connect) or D_out_V=D_in_H; and D_out_H=D_in_V (cross connect). The function is implemented by a digital MUX function in FPGA or in ASIC.

The in and out signals not necessarily need to be complex signal or even bipolar signal, they can be any type of modulation signal including Amplitude shift keying (ASK) or on off keying (OOK).

The output signals 13 and 14 are digital to analog converted in DACs 15 and 16. The electric signals 17 and 18 modulate in the optical modulators 21 and 22 optical laser beams 19 and 20 from the laser light source 21. Optical signals are shown by bold arrows. The two optical modulated signals 23 and 24 are combined in an polarization combiner 25 then amplified 26 and thru an optional DWDM sent to the fiber plant.

The receiver part 30 is presented in FIG. 2 (b). Modulated optical beam 31 after demultiplexing and amplification in 32 is split by a polarization recovery unit 33 into V and H polarized beams 34 and 35. Each polarized signal is optically demodulated in detectors 36 and 37. These detectors can be of any kind, however in the preferred embodiment they are coherent detectors. Incoming light 34 and 35 is mixed with local oscillator beams 38 and 39 emitted by a local oscillator light source 40. The local oscillator beams have the same polarization state as the incoming signals. Then electrical demodulated signals 41 and 42 are converted to digital signals 43 and 44 by corresponding ADCs 45 and 46. Digital polarization controller 47 performs the signal transformation. In one embodiment, it rotates the signal polarization in the opposite direction compared to the transmitter rotation with exactly same random modulation as in the transmitter part and in time sync with the transmitter, taking into account total system and fiber plant propagation time, the implementation is identical to the transmitter part.

The random modulation rate should have a short coherency time in at least order of magnitude shorter than the interleaving depth time in order to evenly randomize the mixing of the two polarizations in each FEC block. Some random function have a tendency to have a long repetition period where the same random sequence is repeated again, this period should be an order of magnitude longer than the interleaver's depth and FEC block length.

An alternative to random polarization is to use a periodical modulation rotation, for example increment/decrement polarization rotation phase by a constant value each time interval, in this case the period of rotation should several order of magnitude shorter than the interleaver's depth and preferably the FEC block should be a whole number of complete rotation period.

In another embodiment, the digital signals 43 and 44 are cross scrambled in the opposite direction with exactly same random sequence as in the transmitter part and in time sync with the transmitter so same bit return to their original place, the implementation is identical to the transmitter part.

The random sequence rate should have a short coherency time in at least order of magnitude shorter than the interleaving depth time in order to evenly randomize the mixing of the two polarizations in each FEC block. Some random function have a tendency to have a long repetition period where the same random sequence is repeated again, this period should be an order of magnitude longer than the interleaver depth and FEC block length.

An alternative to random scrambling sequence is to use a periodical scrambling sequence, for example each even symbol connect straight and each odd symbol connect across, in this case the period of sequence should be several order of magnitude shorter than the interleaver's depth and preferably the FEC block should be a whole number of complete sequence period.

The digital polarization rotator output SIG_out_V 49 and SIG_out_H 48 are digitized/demapped in the symbol demappers 50 and 51, deinterleaved in de-interleavers 52 and 53 and FEC decoded in FEC decoders 54 and 55 to output information data bits 56 and 57 in each polarization.

Assuming two symbols to be encoded A=b1+jb2 and C=b3+jb4; where b1, b2, b3 and b4 are polar bit taking value +/−1.

Straight forward encoding in the transmitter for two polarizations is: V=A; H=B. Other alternatives are:

$V=A+B; H=A-B;$ or $V=A-B; H=A+B;$ $V=A+j*B; H=A-j*B;$ or $V=A-j*B; H=A+j*B;$

All these encoding may be interleaved (round robin) yielding the same or better effect as polarization rotation while keeping initial phase of PHY untouched (code frame synchronization is done later (PHY acquisition independent) and is much simpler.

The polarization change have a correlation time defined as the time the absolute value of the autocorrelation function of the polarization vector fall to below 0.1, let define it as T if the interleaving depth time of an FEC block is longer than correlation time we can assume the bit in that FEC block are scrambled enough, in average are suffering from all polarization or insensitive to some specific polarization PDL.

For a signal at rate R bit/sec, FEC block length of N bit and interleaving depth (length) of M, number of polarization that one FEC function is applied is either K=1 in method 1 or K=2 for method 2, then T should be 1/T>=R/(K*N*M).

Figure 3:
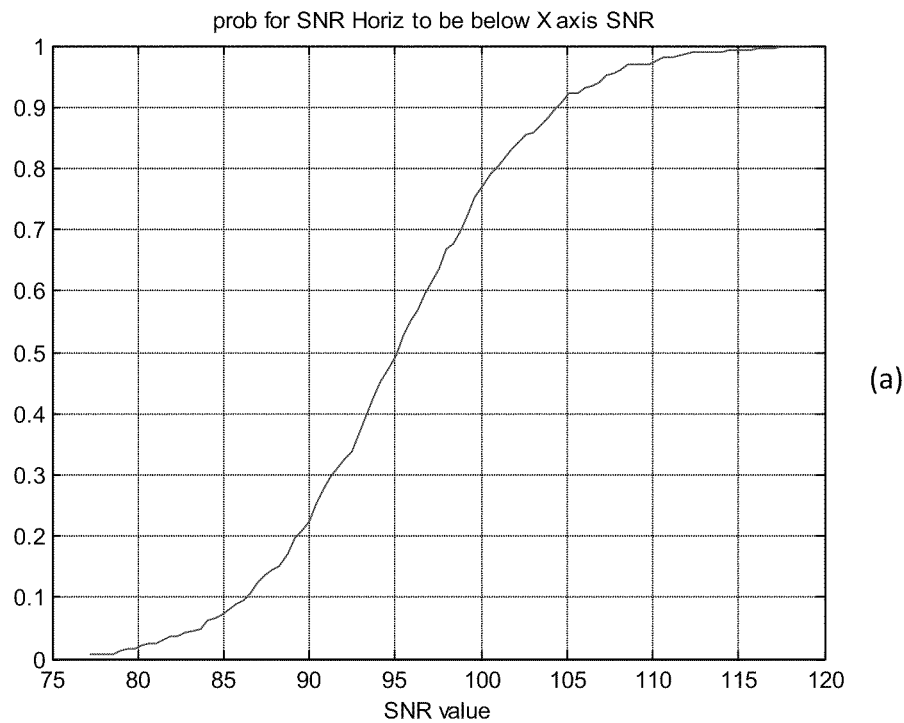
FIG. 3 shows the probability that the Horizontal SNR is above a certain value.
Figure 3:
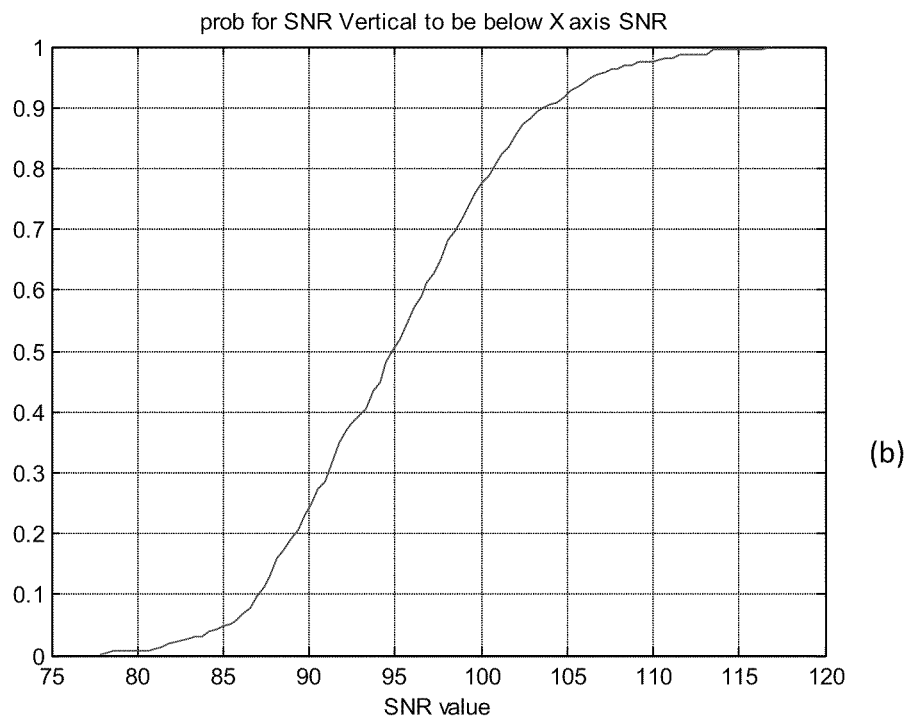

FIGS. 3 (*a*) and (*b*) shows the probability that the Horizontal and Vertical SNR, respectively, to be above a certain value. Simulation for PDL over a 2000 km link (25 segments) shows 0.22 dB average signal to noise loss however 1% of all SNR can loss more than 1.0 dB, simulation done for PDL of 0.3 dB std per segment and 20 db (100) original SNR w/o PDL. The reason for that small loss is most of PDL do not cause loss of ortogonality between H and V polarization on average, noise has very small covariance between polarization: $3e^{-3}$.

This description of a preferred embodiment of the invention has been presented for purposes of illustration and description. It is not intended to be exhaustive or to limit the invention to the precise form disclosed, and obviously many modifications and variations are possible in the light of the above teaching. The described embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An optical communication system for data transmitting from a transmitter to a receiver over fiber using dual polarization light, comprising: a first data controller at the transmitter side; the first controller performs a first polarization mixing transformation on a data for a first polarized beam and a data for a second polarized beam; the second polarized beam being orthogonal to the first polarized beam; a second data controller at the receiver side; the second controller performs a second mixing transformation on a received data transmitted in the first polarized beam and a received data transmitted in the second polarized beam; this second transformation is performed in an opposite direction to a transmitter transformation with exactly same sequence as in the transmitter part, wherein the data is transmitted in orthogonal frequency division multiplexed (OFDM) format, further comprising a forward error correction (FEC) encoder unit for data encoding at the transmitter side; a FEC decoder unit at the receiver side; and wherein FEC block is longer than polarization correlation time; further comprising an interleaver at the transmitter side; and a de-inverleaver at the receiver side; and wherein for the signal at rate R bit/sec, FEC block length of N bit and interleaving depth of M, the polarization correlation time T is T<=2*N*M/R.

2. The system of claim 1, wherein the first mixing transformation is cross scrambling the data for the first polarized beam and the data for the second polarized beam; and the second transformation is cross scrambling in an opposite direction to a transmitter scrambling with exactly same sequence as in the transmitter part.

3. The system of claim 2, wherein the data is scrambled randomly.

4. The system of claim 2, wherein the data is scrambled using a periodical scrambling sequence.

5. The system of claim 1, wherein the first data controller is digital, and it performs digital bit cross scrambling.

6. The system of claim 5, wherein the second data controller is digital, and it performs digital bit cross scrambling.

7. The system of claim 1, wherein the first mixing transformation is a polarization rotation.

8. The system of claim 7, wherein the polarization rotation function is a matrix multiplication:

$$\begin{bmatrix} SIG_{out}^V \\ SIG_{out}^H \end{bmatrix} = \begin{bmatrix} \cos(\alpha) & \sin(\alpha) \\ -\sin(\alpha) & \cos(\alpha) \end{bmatrix} \cdot \begin{bmatrix} SIG_{in}^V \\ SIG_{in}^H \end{bmatrix}$$

wherein $SIG_{in}^V$ and $SIG_{in}^H$ are input data in the first and the second polarizations respectively; and $SIG_{out}^V$ and $SIG_{out}^H$ are output data in the first and the second polarizations respectively, and $\alpha$ is a rotation angle.

9. The system claim 8, wherein $\alpha$ changes on time, $\alpha(t)$.

10. The system of claim 7, wherein the polarization rotation is digital.

11. The system of claim 1, wherein a quadrature phase shift keying data encoding is implemented.

12. The system of claim 1, wherein the data is transmitted over multiple WDM channels.

13. The system of claim 1, wherein the first polarization state is vertical linear polarization and the second polarization state is horizontal linear polarization.

14. A method of optical communication with PDL compensation,. comprising: sending information embedded in dual polarization light from a transmitter to a receiver over fiber; performing a first polarization mixing transformation on a data for a first polarized beam and a data for a second polarized beam at the transmitter; the second polarized beam being orthogonal to the first polarized beam; performing a second polarization mixing transformation on a received data transmitted in the first polarized beam and a received data transmitted in the second polarized beam at the receiver side; this second transformation is performed in an opposite direction to a first transformation with exactly same sequence as in the transmitter part, wherein the data is transmitted in orthogonal frequency division multiplexed (OFDM) format; further comprising data FEC encoding at the transmitter and decoding at the receiver, wherein FEC block is longer than polarization correlation time; performing interleaving at an interleaver at the transmitter side; and de-interleaving at a de-inverleaver at the receiver side; and wherein for the signal at rate R bit/sec, FEC block length of N bit and interleaving depth of M, the polarization correlation time T is $T<=2*N*M/R$.

15. The method of claim 14, wherein the first mixing transformation is cross scrambling.

16. The method of claim 14, wherein the first mixing transformation is a polarization rotation according to:

$$\begin{bmatrix} SIG_{out}^V \\ SIG_{out}^H \end{bmatrix} = \begin{bmatrix} \cos(\alpha) & \sin(\alpha) \\ -\sin(\alpha) & \cos(\alpha) \end{bmatrix} \cdot \begin{bmatrix} SIG_{in}^V \\ SIG_{in}^H \end{bmatrix}$$

wherein $SIG_{in}^V$ and $SIG_{in}^H$ are input data in the first and the second polarizations respectively; and $SIG_{out}^V$ and $SIG_{out}^H$ are output data in the first and the second polarizations respectively and $\alpha$ is rotation angle.

\* \* \* \* \*